US011965082B2

(12) United States Patent
Blackford et al.

(10) Patent No.: US 11,965,082 B2
(45) Date of Patent: Apr. 23, 2024

(54) LOW VOC ADHESIVE COMPOSITION

(71) Applicant: PPG Architectural Finishes, Inc., Pittsburgh, PA (US)

(72) Inventors: Timothy D. Blackford, Gibsonia, PA (US); Glen J. Kaszubski, Copley, OH (US); Maria S. French, Canfield, OH (US); Theodore F. Novitsky, Jr., Butler, PA (US)

(73) Assignee: PPG Architectural Finishes, Inc., Pittsburgh, PA (US)

( * ) Notice: Subject to any disclaimer, the term of this patent is extended or adjusted under 35 U.S.C. 154(b) by 161 days.

(21) Appl. No.: 17/053,972

(22) PCT Filed: May 10, 2019

(86) PCT No.: PCT/IB2019/053852
§ 371 (c)(1),
(2) Date: Nov. 9, 2020

(87) PCT Pub. No.: WO2019/215681
PCT Pub. Date: Nov. 14, 2019

(65) Prior Publication Data
US 2021/0269627 A1 Sep. 2, 2021

Related U.S. Application Data

(60) Provisional application No. 62/669,589, filed on May 10, 2018.

(51) Int. Cl.
*C09J 11/04* (2006.01)
*B32B 7/08* (2019.01)
(Continued)

(52) U.S. Cl.
CPC ............ *C08L 23/0853* (2013.01); *B32B 7/08* (2013.01); *B32B 7/12* (2013.01); *B32B 37/1284* (2013.01);
(Continued)

(58) Field of Classification Search
CPC .... C09J 123/0853; C09J 163/00; C09J 11/04; C08K 3/34; B32B 7/12
See application file for complete search history.

(56) References Cited

U.S. PATENT DOCUMENTS 3,726,700 A 4/1973 Wildt
5,112,402 A 5/1992 Freeman et al.
(Continued)

FOREIGN PATENT DOCUMENTS

JP 2005048078 A 2/2005
JP 2005048078 A 5/2005
(Continued)

OTHER PUBLICATIONS

Calcium Carbonate Portfolio, General Information, IMERYS Carbonates, 2014, 2 pages.
(Continued)

*Primary Examiner* — Joanna Pleszczynska

(57) ABSTRACT

Disclosed are compositions containing a pigment mixture and a binder. The pigment mixture contains a non-ionic platy filler and at least a second pigment material. The non-ionic platy filler may be present in an amount of 1% by weight to 9% by weight and the at least one second pigment material may be present in an amount of at least 30% by weight based on total weight of the pigment mixture. The at least one second pigment material may have a weighted average oil absorption of 20 g linseed oil absorbed per 100 g at least one second pigment material to 100 g linseed oil absorbed per 100 g at least one second pigment material based on total (Continued)

weight of the pigment mixture. Also disclosed are articles comprising an adhesive comprising one of the compositions in an at least partially dried state positioned between first and second substrates.

20 Claims, 9 Drawing Sheets

(51) Int. Cl.
| | | |
|---|---|---|
| *B32B 7/12* | (2006.01) | |
| *B32B 37/12* | (2006.01) | |
| *C08L 23/08* | (2006.01) | |
| *C08L 31/04* | (2006.01) | |
| *C09J 123/08* | (2006.01) | |
| *C08K 3/34* | (2006.01) | |

(52) U.S. Cl.
CPC ......... *C08L 31/04* (2013.01); *C09J 123/0853* (2013.01); *C08K 3/34* (2013.01)

(56) References Cited

U.S. PATENT DOCUMENTS

| | | | |
|---|---|---|---|
| 5,185,213 | A | 2/1993 | Fujita et al. |
| 5,441,564 | A | 8/1995 | Vogt |
| 5,574,081 | A | 11/1996 | Kroon |
| 5,882,396 | A * | 3/1999 | Hiorns ................ C09C 1/025 |
| | | | 106/486 |
| 6,080,802 | A | 6/2000 | Emmons et al. |
| 6,517,628 | B1 | 2/2003 | Pfaff et al. |
| 7,217,756 | B2 | 5/2007 | Hu et al. |
| 7,645,826 | B2 | 1/2010 | Sophiea et al. |
| 7,744,994 | B2 | 6/2010 | Huang |
| 7,893,149 | B2 | 2/2011 | Hermes et al. |
| 7,893,151 | B2 | 2/2011 | Johnson et al. |
| 8,142,887 | B2 | 3/2012 | Fugitt et al. |
| 8,877,840 | B2 | 11/2014 | Gozum et al. |
| 9,040,610 | B2 | 5/2015 | Gozum et al. |
| 9,102,846 | B1 | 8/2015 | Gozum et al. |
| 9,181,658 | B2 | 11/2015 | Bushhouse et al. |
| 9,315,643 | B2 | 4/2016 | Gozum et al. |
| 9,732,473 | B2 | 8/2017 | Fugitt et al. |
| 2006/0106129 | A1 | 5/2006 | Gernon et al. |
| 2008/0287587 | A1 | 11/2008 | Lin et al. |
| 2010/0266819 | A1 | 10/2010 | Bushhouse et al. |
| 2011/0054105 | A1 | 3/2011 | Feeney et al. |
| 2011/0086945 | A1 | 4/2011 | Gozum et al. |
| 2011/0112234 | A1 | 5/2011 | Hall-Goulle et al. |
| 2012/0145040 | A1 | 6/2012 | Fugitt et al. |
| 2012/0216944 | A1 | 8/2012 | Langford |
| 2013/0125790 | A1 * | 5/2013 | McLachlan ............ C09D 5/00 |
| | | | 106/487 |
| 2014/0150970 | A1 | 6/2014 | Desai et al. |
| 2014/0209010 | A1 | 7/2014 | Risi |
| 2015/0210881 | A1 | 7/2015 | Gozum et al. |

FOREIGN PATENT DOCUMENTS

| | | |
|---|---|---|
| RU | 2421478 C2 | 6/2011 |
| RU | 2430945 C2 | 10/2011 |
| RU | 2531826 C2 | 10/2014 |
| WO | 2009/017690 A2 | 2/2009 |
| WO | 2012074617 | 6/2012 |

OTHER PUBLICATIONS

Drikalite, Technical Information, IMERYS Carbonates, 2015, 1 page.
Minex Functional Fillers and Extenders, Technical Data, unimin Specialty Minerals Inc., 2014, 2 pages.
TALCRON Montana talc, Technical Data, Specialty Minerals, Barretts Minerals Inc., 2007, 1 page.
Celatom Diatomaceous Earth Functional Additives, Technical Data Sheet, EP Minerals, LLC., 2016, 1 page.
Snobrite White Kaolin Fillers and Extenders, Technical Date, unimin Specialty Minerals Inc., 2014, 2 pages.

* cited by examiner

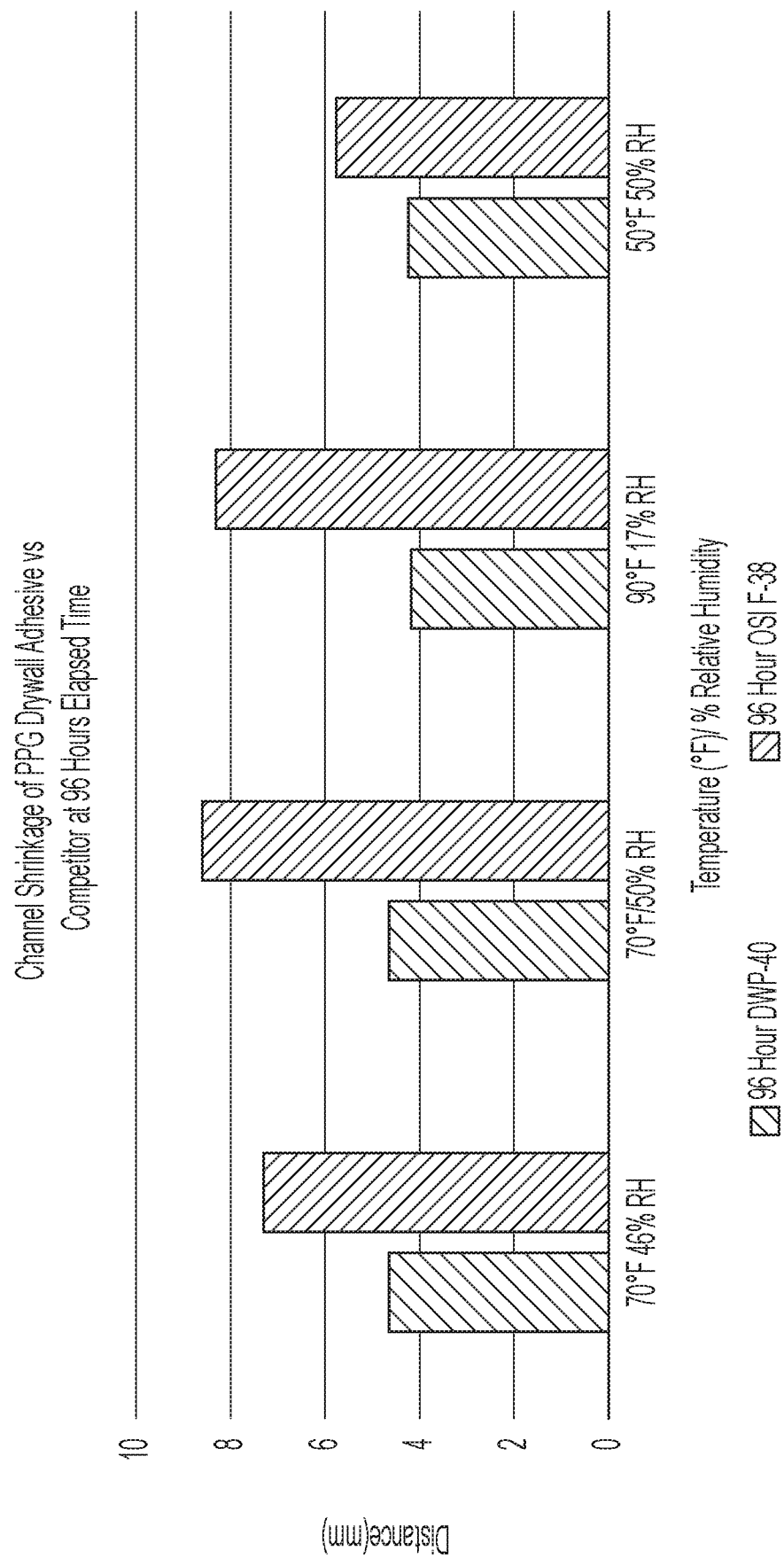

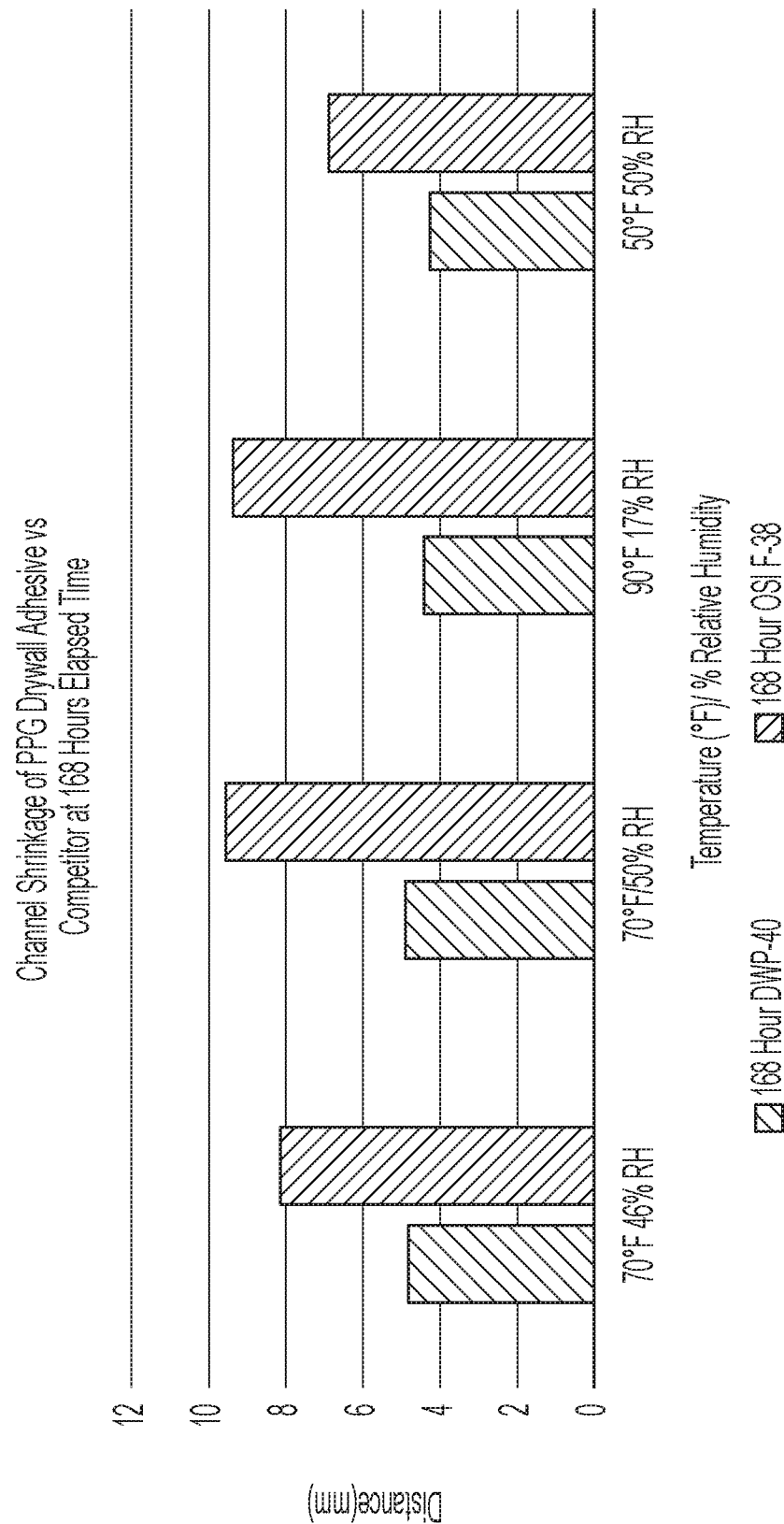

LOW VOC ADHESIVE COMPOSITION

CROSS-REFERENCE

This application claims priority to U.S. Provisional Patent Application No. 62/669,589, filed on May 10, 2018, and entitled "Low VOC Adhesive Composition."

FIELD

The present invention relates to adhesive compositions, such as those adhesives having low volatile organic compound.

BACKGROUND

Adhesives are utilized in the construction industry to adhere sheet rock to a variety of surfaces such as wood, galvanized steel, aluminum, sheet rock, foamboard, and the like. The present invention is directed towards adhesive compositions that provide sufficient bond strength and are easy to apply for use in bonding together substrate materials.

SUMMARY

According to the present invention, disclosed herein is a composition comprising: a pigment mixture comprising a non-ionic platy filler present in the pigment mixture in an amount of 1% by weight to 9% by weight based on total weight of the pigment mixture and at least a second pigment material; and a binder material.

Also disclosed herein is a composition comprising: a pigment mixture comprising a non-ionic platy filler and at least one second pigment material present in the pigment mixture in an amount of at least 30% by weight based on total weight of the pigment mixture and having a weighted average oil absorption of 20 g linseed oil absorbed per 100 g at least one second pigment material based on total weight of the pigment mixture to 100 g linseed oil absorbed per 100 g at least one second pigment material based on total weight of the pigment mixture to; and a binder material.

Also disclosed are adhesives comprising a composition of the present invention in an at least partially dried state.

Also disclosed are articles comprising first and second substrates and an adhesive comprising a composition of the present invention in an at least partially dried state positioned between the first and second substrates.

DETAILED DESCRIPTION

Figure 1B:
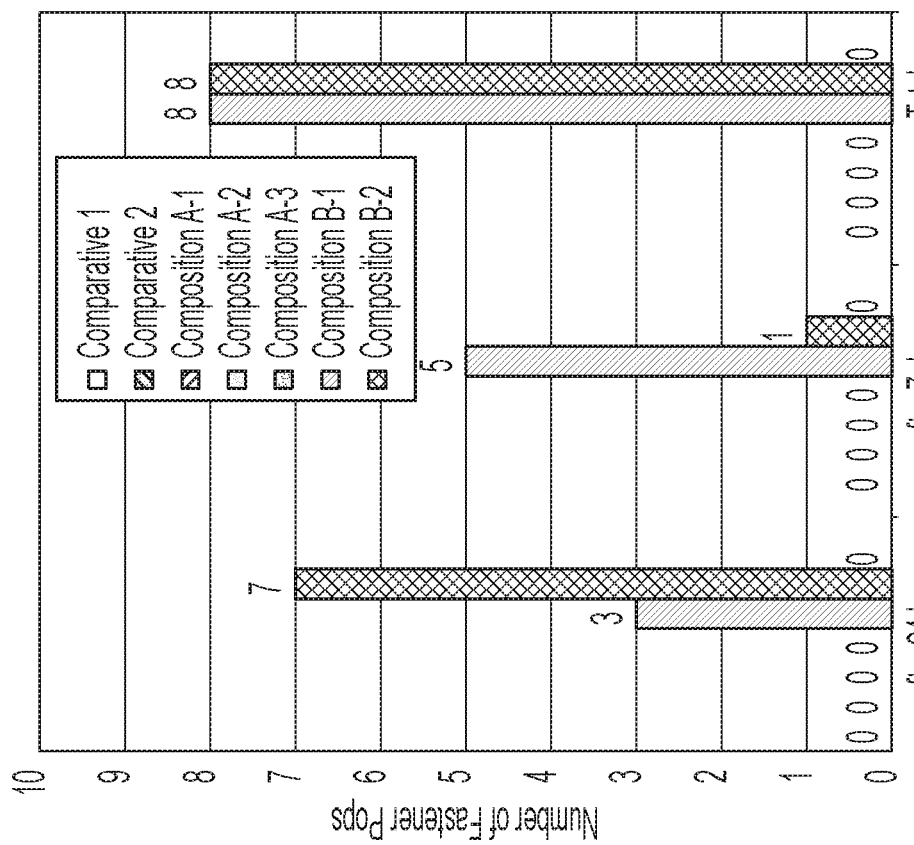
FIG. 1 shows the number of fastener pops per composition 24 hours and 7 days following attachment of the drywall to the stud at 22.8° C. and 46% relative humidity. In panel A, joint compound was applied to the fasteners on the same day as the adhesive was applied to the drywall and in panel B, joint compound was applied to the fasteners 18-24 hours after application of the adhesive composition to the drywall.

For purposes of the following detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached Aspects are approximations that may vary depending upon the desired properties to be obtained by the present invention. At the very least, and not as an attempt to limit the application of the doctrine of equivalents to the scope of the Aspects, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "a" siliceous material and "a" pigment material, a combination (i.e., a plurality) of these components can be used.

In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, an adhesive composition "applied onto" a substrate does not preclude the presence of one or more other intervening coating layers of the same or different composition located between the adhesive composition and the substrate.

As used herein, the term "adhesive" means a composition that, in an at least partially dried state, is capable of bonding substances together by surface attachment.

As used herein, the term "monomer" refers to a component that can be polymerized with another polymerizable component such as another monomer or a polymer to form a compound that comprises residues of the monomeric or polymeric components, respectively.

As used herein, the term "polymer" refers to prepolymers, oligomers, homopolymers, copolymers, and blends or mixtures thereof.

As used herein, the term "(meth)acrylate" encompasses both acrylates and methacrylates.

As used herein, "aqueous composition" refers to a solution or dispersion in a medium that comprises predominantly water. For example, the aqueous medium may comprise water in an amount of more than 50 wt. %, or more than 70 wt. %, or more than 80 wt. %, or more than 90 wt. %, or more than 95 wt. %, based on the total weight of the medium. The aqueous medium may for example consist substantially of water.

As used herein, the term "dispersion" refers to a two-phase transparent, translucent or opaque system in which the pigment mixture and the binder are in the dispersed phase and the dispersing medium, which includes water, is in the continuous phase.

As used herein, "solution" refers to a system in which the solute is uniformly distributed within the solvent.

As used herein, "emulsion" refers to a mixture of two or more liquids in which one is present as droplets distributed throughout the other.

As defined herein, a "1K" or "one-component" adhesive composition is a composition in which all of the ingredients may be premixed and stored and wherein, upon application to a substrate surface, water migrates from the adhesive composition to the substrate surface or evaporates or diffuses into the air interface and forms a film.

As defined herein, a "2K" or "two-component" adhesive composition is a composition in which at least a portion of the reactive components readily react and cure without activation from an external energy source, such as at ambient or slightly thermal conditions, when mixed. One of skill in the art understands that the two components of the adhesive composition are stored separately from each other and mixed just prior to application of the adhesive composition.

As further defined herein, ambient conditions generally refer to room temperature and humidity conditions or temperature and humidity conditions that are typically found in the area in which the adhesive is being applied to a substrate, e.g., at 20° C. to 40° C. and 20% to 80% relative humidity.

As used herein, unless indicated otherwise, the term "substantially free" means that a particular material is not purposefully added to a mixture or composition and is only present as an impurity in a trace amount of less than 1% by weight based on a total weight of the mixture or composition, respectively. As used herein, unless indicated otherwise, the term "essentially free" means that a mixture or composition contains less than 0.1% by weight based on total weight of the mixture or composition, respectively. As used herein, unless indicated otherwise, the term "completely free" means that a mixture or composition does not comprise a particular material, i.e., the mixture or composition comprises 0% by weight of such material.

The present invention is directed to a composition comprising, or consisting essentially of, or consisting of, a pigment mixture and a binder. The composition may be an aqueous composition, such as a 1K or a 2K adhesive composition.

The pigment mixture may comprise clay minerals, mineral fibers, cellulose fibers, carbon fibers, glass or polymeric fibers or beads, carbonates, mica, powdered slate, montmorillonite flakes, glass flakes, metal flakes, graphite, iron oxide, cellulose fibers, carbon fibers, glass or polymeric fibers or beads, ferrite, calcium, barytes, ground natural or synthetic rubber, silica, aluminum hydroxide, alumina powder and mixtures thereof. Useful clay minerals include a non-ionic platy filler such as talc, pyrophyllite, chlorite, vermiculite, or combinations thereof. Useful carbonates include calcium carbonate, magnesium carbonate, or combinations thereof. Useful silica includes diatomaceous earth, perlite, sand, or combinations thereof.

The pigment mixture may comprise, or consist essentially of, or consist of, a non-ionic platy filler and at least one second pigment material. The non-ionic platy filler may be present in the pigment mixture in an amount of at least 1% by weight based on total weight of the pigment mixture, such as at least 2% by weight, and may be present in an amount of no more than 9% by weight based on total pigment weight, such as no more than 7% by weight. The non-ionic platy filler may be present in the pigment mixture in an amount of 1% by weight to 9% by weight based on total weight of the pigment mixture, such as 2% by weight to 7% by weight.

The non-ionic platy filler may have a particle size of at least 0.8 μm, as reported by manufacturer, such as at least 1 μm, and may have a particle size of no more than 15 μm, as reported by manufacturer, such as no more than 8 μm. The non-ionic platy filler may have a particle size of 0.8 μm to 15 μm, as reported by manufacturer, such as 1 μm to 15 μm.

The non-ionic platy filler may have an oil absorption of at least 20 g linseed oil absorbed per 100 g non-ionic platy filler, such as at least 25 g/100 g, and may have an oil absorption of no more than 100 g linseed oil absorbed per 100 g non-ionic platy filler, such as no more than 60 g/100 g. The non-ionic platy filler may have an oil absorption of 20 g linseed oil absorbed per 100 g non-ionic platy filler to 100 g linseed oil absorbed per 100 g non-ionic platy filler, such as 25 g/100 g to 60 g/100 g.

The composition of the present invention also includes at least one second pigment material. The at least one second pigment material may be present in the pigment mixture in an amount of at least 30% by weight based on total weight of the pigment mixture, such as at least 50% by weight, and may be present in the pigment mixture in an amount of no more than 80% by weight, such as no more than 70% by weight. The at least one second pigment material may be present in the pigment mixture in an amount of 30% by weight to 80% by weight based on total weight of the pigment mixture, such as 50% by weight to 70% by weight.

The at least one second pigment material may have a particle size of at least 0.7 μm, as reported by manufacturer, such as at least 1 μm, and may have a particle size of no more than 100 μm, as reported by manufacturer, such as no more than 15 μm. The at least one second pigment material may have a particle size of 0.7 μm to 100 μm, as reported by manufacturer, such as 1 μm to 15 μm.

The at least one second pigment material may have an oil absorption of at least 20 g linseed oil absorbed per 100 g at least one second pigment material, such as at least 25 g/100 g, and may have an oil absorption of no more than 100 g linseed oil absorbed per 100 g at least one second pigment material, such as no more than 60 g/100 g. The at least one second pigment material may have an oil absorption of 20 g linseed oil absorbed per 100 g at least one second pigment material to 100 g linseed oil absorbed per 100 g at least one second pigment material, such as 25 g/100 g to 60 g/100 g.

The at least one second pigment may have a weighted average oil absorption of at least 20 g linseed oil absorbed per 100 g total at least one second pigment, such as at least 25 g/100 g, and may have a weighted average oil absorption of no more than 100 g linseed oil absorbed per 100 g total at least one second pigment, such as no more than 75 g/100 g. The at least one second pigment may have a weighted average oil absorption of 20 g linseed oil absorbed per 100 g total at least one second pigment to 100 g linseed oil absorbed per 100 g at least one second pigment, such as 25 g/100 g to 75 g/100 g.

The pigment mixture (the non-ionic platy filler and at least one second pigment material) may have a weighted average oil absorption of at least 10 g linseed oil absorbed per 100 g total at least one second pigment, such as at least 20 g/100 g, and may have a weighted average oil absorption of no more than 75 g linseed oil absorbed per 100 g total at least one second pigment, such as no more than 60 g/100 g. The at least one second pigment may have a weighted average oil absorption of 10 g linseed oil absorbed per 100 g total at least one second pigment to 75 g linseed oil absorbed per 100 g at least one second pigment, such as 20 g/100 g to 60 g/100 g.

The composition also includes a binder. The binder may be present in the composition in an amount of at least 20% by weight, based on total weight of the composition, such as at least 25% by weigh, and may be present in an amount of no more than 50% by weight based on total weight of the composition, such as no more than 45% by weight. The binder may present in the composition in an amount of 20% by weight to 50% by weight based on total weight of the composition, such as 25% by weight to 45% by weight.

The binder may comprise a film-forming polymer. According to the invention, the binder may be an aqueous dispersion or emulsion. For example, one or more surfactants or emulsifying agents may be added to a film-forming polymer in order to stabilize it in preparing a composition of the present invention. Other film-forming polymers are provided as emulsions with one or more surfactants already included. The person of ordinary skill in the art can determine whether one or more surfactants or emulsifying agents may need to be added to a film-forming polymer based on the particular emulsion used. Non-limiting examples of useful film-forming polymers include ethylenically unsaturated carboxylic acid monomers such as acrylic acid, methacrylic acid, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof. Other non-limiting examples of useful film-forming polymers include chemically modified polyolefins, polyurethanes, epoxides, polyacrylates, polyesters, (poly)vinyl acetates and mixtures thereof.

Non-limiting examples of useful ethylenically unsaturated vinyl monomers include alkyl esters of acrylic and methacrylic acids, such as methyl acrylate, ethyl acrylate, methyl methacrylate, ethyl methacrylate, butyl acrylate, butyl methacrylate, 2-ethylhexyl acrylate, 2-ethylhexyl methacrylate, 2-hydroxyethyl acrylate, 2-hydroxyethyl methacrylate, hydroxypropyl methacrylate, ethylene glycol dimethacrylate, isobornyl methacrylate and lauryl methacrylate; vinyl aromatics such as styrene and vinyl toluene; acrylamides such as N-butoxymethyl acrylamide; acrylonitriles; dialkyl esters of maleic and fumaric acids; vinyl and vinylidene halides; vinyl acetate; vinyl ethers; allyl ethers; allyl alcohols; derivatives thereof and mixtures thereof. Suitable acrylic water-based dispersions useful in the present invention include Neocryl XK-90, A-1070, A-1090, BT-62, A-1079 and A-523® (Nitto Denko Avecia Inc., Milford, Mass.); Dow Latex 432, Maincote™, Rhoplex® and Avanse® (for example, Maincote HG-54, Rhoplex WL-71; Avanse MV-100) (Dow Chemical Company, Midland, Mich.); Daitosol 5000 AD and 5000 SJ (Daito Kasey Kogyo); NeoCryl A-1 131 and XK-52 (DSM Coating Resins, The Netherlands). Suitable styrene-acrylic water-based dispersions useful in the present include JONCRYL HPE 2157 (BASF Corporation); NeoCryl A-1091 (DSM Coating Resins, The Netherlands); Carboset (The Lubrizol Corporation); and Lucidene (Hydrite Chemical Co.) and useful styrene-butadiene water-based dispersions include Rovene 5499 (Mallard Creek Polymers); Styronal D517, BUTOFAN NS 144, BUTOFAN NS166, BUTOFAN 4202, BUTOFAN NS209, BUTOFAN NS 222, and BUTOFAN NS 299 (BASF Corporation). Other useful binders include thermoplastic polymeric film-forming materials such as polyvinyl acetate; aromatic vinyl polymers; vinyl copolymers having vinyl aromatic hydrocarbons as monomer components such as polystyrene, styrene-butadiene copolymers, styrene-divinylbenzene copolymers and styrene-acrylonitrile copolymers; saturated polyesters including saturated aliphatic polyesters such as polyneopentyl adipate, polypropylene adipate and poly epsilon-caprolactone; polyacrylates such as polyalkyl (meth)acrylates having alkyl groups with 1-8 carbon atoms, polymethacrylates or polyalkyl(meth)acrylates obtained by polymerization of methyl methacrylate, isobutyl methacrylate and 2-ethylhexyl acrylate; saturated polyester urethanes; polybutadienes; polyvinyl chlorides and polyvinyl chloride/acetates; ethylene vinyl acetates; polyvinyl alcohols; and the like.

Useful substantially saturated polyesters are prepared from polyfunctional acids and polyhydric alcohols by methods such as are disclosed in U.S. Pat. No. 4,739,019 at column 3, line 22 through column 5, line 15. The binder may comprise an effectively thermoplastic polyester having a weight average molecular weight of less than 10,000 and which may be insoluble in the one or more epoxide group containing materials. "Insoluble," when used with respect to the thermoplastic polyester, means that the mixture of epoxide component and effectively thermoplastic polyester results in a hazy, heterogeneous phase.

The term "effectively thermoplastic" as used herein with respect to the binder means that the polyester is not reactive with the one or more epoxide group containing materials. The effectively thermoplastic polyester may be a saturated polyester although it should be understood that these saturated polyesters can contain some percentage of unsaturated units. The amount of unsaturation can vary widely so long as the thermoplastic nature of the polyester is maintained, i.e., it does not react into the composition but rather is present as a blended ingredient. The saturated polyester may contain no more than about 10 percent by weight of unsaturated units, the percentage being based on the total weight of all the ingredients of the polyester.

The effectively thermoplastic polyester may be substantially free of aromatic units. As used herein, the term "substantially free," when used with respect to aromatic units in the effectively thermoplastic polyester, means that the effectively thermoplastic polyester contains no more than 10 percent by weight of aromatic units, the percentage based upon the total weight of all of the ingredients of the polyester. As used herein, an "aromatic unit," when used with respect to effectively thermoplastic polyester means

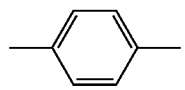

which has a molecular weight of 76. The aromatic units are generally derived from aromatic acids or anhydrides such as phthalic acid, isophthalic acid and terephthalic acid.

The effectively thermoplastic polyester may have a weight average molecular weight of less than 10,000, such as 1,000 to about 8,000 as determined by gel permeation chromatography (GPC) using a differential refractometer as the detector calibrated using a polystyrene standard (Pressure Chemicals Company, Pittsburgh, Pa.) having dispersities (dispersity=weight average molecular weight/number average molecular weight) ranging from 1.05 to 1.10 and viscosity average molecular weights of 900,000; 233,000; 50,000; 17,500; 4,000. To obtain a calibration curve, a set of 0.1 percent (10 milligram polystyrene/1.0 ml tetrahydrofuran) polystyrene solutions in tetrahydrofuran were prepared and a 0.5 ml sample size was injected into the columns and a GPC chromatogram was obtained. The elution volume of each peak corresponding to a given molecular weight of the polystyrene standard was measured and the data was plotted on a semilogarithmic paper (logarithm scale in the ordinate and linear scale in the abscissa). A linear least squares plot of $\log_{10}$ (molecular weight) versus elution volume in milliliters was used as a calibration curve. The lowest molecular weight of the polystyrene standard used was 4,000, and the calibration curve beyond that was extrapolated down to 100. The upper and lower exclusion limits of this set of columns are 5,000,000 and 100, respectively, in terms of polystyrene molecular weight. The sample whose molecular weights are to be determined was prepared as a 1.0 percent tetrahydrofuran solution. After filtration through a 0.5 micron filter, available from Millapore Corporation, a 0.5 ml sample size was injected into the columns and a GPC chromatogram obtained under the same experimental conditions as the calibration. From the resulting calibration curve of molecular weight versus retention time, a molecular weight relative to the standard can be assigned to the retention times of the sample. The height (H) of the curve at the corresponding retention times is recorded by the computer. From these height-molecular weight (M) combinations the following averages are calculated: weight average $$\text{molecular weight} = \frac{\sum H_i M_i}{\sum H_i}$$

This is the number reported.

Suitable polyesters are those which satisfy the aforedescribed requirements and are prepared from polyfunctional acids and polyhydric alcohols. Examples of saturated acids for preparing the saturated polyesters include adipic acid, azelaic acid, sebacic acid and the anhydrides thereof where they exist. When some proportion of unsaturation is present, it is commonly introduced by the use of unsaturated polyfunctional acids such as maleic acid and fumaric acid. Commonly utilized polyhydric alcohols are ethylene glycol, propylene glycol, diethylene glycol, dipropylene glycol, butylene glycol, glycerol, trimethylolpropane, pentaerythritol and sorbital. The polyester may be prepared from a diol and diacid.

The polyesters useful in the present invention may be prepared by standard procedures well known in the art. In an example, diols and diacids may be charged to a reaction vessel, heated to a temperature ranging from 200° C. to 300° C. and removing the water of condensation by distillation. Solvents such as xylene or toluene may be employed in the reaction mixture to help remove water by azeotropic distillation and an esterification catalyst such as a tin compound, for example, dibutyltin oxide or butyl stannoic acid can also be employed to increase the rate of reaction. Of course, functional derivatives of the diacids such as esters anhydrides or acid chlorides may be employed. As used herein, the term "polyester" also applies to resins which contain oil or fatty acid modification, i.e., alkyd resins.

The binder may, for example, include water-based alkyd emulsions such as Kelsol DV-5862 and BECKSOL 12-035 (commercially available from Reichhold Company, NC).

According to the invention, the film-forming polymer may comprise an epoxy compound. Suitable epoxy compounds that may be used include monoepoxides, polyepoxides, or combinations thereof.

Suitable monoepoxides that may be used include monoglycidyl ethers of alcohols and phenols, such as phenyl glycidyl ether, n-butyl glycidyl ether, cresyl glycidyl ether, isopropyl glycidyl ether, glycidyl versatate, for example, CARDURA E available from Shell Chemical Co., and glycidyl esters of monocarboxylic acids such as glycidyl neodecanoate, and mixtures of any of the foregoing.

Suitable polyepoxides include polyglycidyl ethers of Bisphenol A, such as Epon® 828 and 1001 epoxy resins, and Bisphenol F diepoxides, such as Epon® 862, which are commercially available from Hexion Specialty Chemicals, Inc. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and combinations thereof.

Other suitable water-borne or water-dispersible epoxy resins that may be used include epoxy resins such as EPI-REZ 3514-W56 (an aqueous dispersion of an epoxy resin having an epoxy equivalent weight of 205 g/eq to 225 g/eq), EPI-REZ 3540-WY-55 (an aqueous dispersion of bisphenol A epoxy resin having an equivalent weight of 1850 g/eq), EPI-REZ 5054-W-65 (an aqueous dispersion of a bisphenol A epoxy resin with an equivalent weight of 192 g/eq), EPI-REZ 3515-W-60 (an aqueous dispersion of a bisphenol A epoxy resin with an equivalent weight of 220 g/eq to 260 g/eq), EPI-REZ 3522-W-60 (an aqueous dispersion of a solid bisphenol A epoxy resin 550 g/eq to 650 g/eq), and EPON 828 (an epoxy resin having an epoxy equivalent weight of 185 g/eq to 192 g/eq) (all commercially available from Momentive Specialty Chemicals Inc.), Araldite PZ3901, PZ3961-1, and PZ323 (commercially available from Huntsman Corporation), Waterpoxy 1422 (commercially available from BASF Corporation), Ancarez AR555 1422 (commercially available from Evonik Industries), and DER 916 (commercially available from Dow).

In addition to the polyepoxides described above, additional polymers containing pendant epoxy groups also may be used to form the adhesive composition of the present invention. These polymers may be made by copolymerizing a variety of polymerizable ethylenically unsaturated monomers at least one of which is an epoxy containing monomer, e.g., glycidyl (meth)acrylate or allyl glycidyl ether. An example of such an additional polymer includes but is not limited to Epon® 1007.

Other useful epoxides that may be used to form the adhesive composition of the present invention include polyepoxides and are disclosed, for example, in U.S. Publication No. US 2014/0150970 at paragraphs [0023] to [0027], incorporated by reference herein.

Useful polyols that may be used to form an epoxy-functional resin for use in the adhesive composition include diols, tetraols and higher functional polyols. The polyols can be based on a polyether chain derived from ethylene glycol, propylene glycol, butylenes glycol, hexylene glycol and the like and mixtures thereof. The polyol can also be based on a polyester chain derived from ring opening polymerization of caprolactone. Suitable polyols may also include polyether polyol, polyurethane polyol, polyurea polyol, acrylic polyol, polyester polyol, polybutadiene polyol, hydrogenated polybutadiene polyol, polycarbonate polyols, polysiloxane polyol, and combinations thereof. Polyamines corresponding to polyols can also be used, and in this case, amides instead of carboxylic esters will be formed with acids and anhydrides.

Suitable diols that may be utilized to form the epoxy-functional resin for use in the adhesive composition are diols having a hydroxyl equivalent weight of between 30 and 1000. Exemplary diols having a hydroxyl equivalent weight from 30 to 1000 include diols sold under the trade name Terathane®, including Terathane® 250, available from Invista. Other exemplary diols having a hydroxyl equivalent weight from 30 to 1000 include ethylene glycol and its polyether diols, propylene glycol and its polyether diols, butylenes glycol and its polyether diols, hexylene glycols and its polyether diols, polyester diols synthesized by ring opening polymerization of caprolactone, and urethane diols synthesized by reaction of cyclic carbonates with diamines. Combination of these diols and polyether diols derived from combination various diols described above could also be used. Dimer diols may also be used including those sold under trade names Pripol® and Solvermol™ available from Cognis Corporation.

Polytetrahydrofuran-based polyols sold under the trade name Terathane®, including Terathane® 650, available from Invista, may be used. In addition, polyols based on dimer diols sold under the trade names Pripol® and Empol®, available from Cognis Corporation, or bio-based polyols, such as the tetrafunctional polyol Agrol 4.0, available from BioBased Technologies, may also be utilized.

Useful anhydride compounds to functionalize the polyol with acid groups include hexahydrophthalic anhydride and its derivatives (e.g., methyl hexahydrophthalic anhydride); phthalic anhydride and its derivatives (e.g., methyl phthalic anhydride); maleic anhydride; succinic anhydride; trimelletic anhydride; pyromelletic dianhydride (PMDA); 3,3',4, 4'-oxydiphthalic dianhydride (ODPA); 3,3',4,4'-benzopherone tetracarboxylic dianhydride (BTDA); and 4,4'-diphthalic(hexamfluoroisopropylidene)anhydride (6FDA). Useful diacid compounds to functionalize the polyol with acid groups include phthalic acid and its derivatives (e.g., methyl phthalic acid), hexahydrophthalic acid and its derivatives (e.g., methyl hexahydrophthalic acid), maleic acid, succinic acid, adipic acid, etc. Any diacid and anhydride can be used.

The epoxy compound may be present in the composition in an amount of at least 50% by weight based on total composition weight, such as at least 60% by weight, such as at least 70% by weight, and in some cases may be no more than 95% by weight based on total composition weight, such as no more than 90% by weight, such as no more than 85% by weight. The epoxy compound may be present in the composition in an amount from 50% to 95% by weight based on the total composition weight, such as from 60% to 90%, such as from 70% to 87%.

The molecular weight of the epoxy compound may be at least 44, such as at least 58, and in some cases may be no more than 5000, such as no more than 3000, such as no more than 1000. The molecular weight of the epoxy compound may be from 44 to 5000, such as from 58 to 3000, such as from 58 to 1000.

The epoxy compound may have an epoxy equivalent weight (EEW) of at least 44, such as at least 58, and in some cases may be no more than 2500, such as no more than 1500, such as no more than 500. According to the present invention, the epoxy compound may have an EEW of from 44 to 2500, such as from 58 to 1500, such as from 58 to 500. As used herein, EEW refers to the molecular weight of the epoxide compound divided by the number of epoxy groups per molecule.

The composition may have a pigment to binder ratio of at least 1:1, such as at least 2:1, and may have a pigment to binder ratio of no more than 4:1, such as no more than 3.5:1. The composition may have a pigment to binder ratio of to 1:1 to 4:1, such as 2:1 to 3.5:1.

The composition may have a Brookfield viscosity of at least 300,000 cps measured at 5 rpm with a TD spindle at 25° C. measured at 30 days following combining the pigment mixture and the binder, such as at least 450,000 cps, and may have a Brookfield viscosity of no more than 3,000,000 cps measured at 5 rpm with a TD spindle at 25° C. measured at 30 days following combining the pigment mixture and the binder, such as no more than 1,200,000 cps. The composition may have a Brookfield viscosity of 300, 000 cps to 3,000,000 cps measured at 5 rpm with a TD spindle at 25° C. measured at 30 days following combining the pigment mixture and the binder, such as 450,000 cps to 1,200,000 cps.

The composition may have a total solids content of at least 64% by weight based on total weight of the composition, such as at least 67%, and may have a total solids content of no more than 82% by weight based on total weight of the composition, such as no more than 78%. The composition may have a total solids content of 64% to 82% based on total weight of the composition, such as 67% to 78%. As used herein, "total solids" refers to the non-volatile content of the composition, i.e., materials which will not volatilize when heated to 105° C. for 60 minutes.

The composition may further comprise one or more plasticizers. Non-limiting examples of suitable plasticizers include adipates, benzoates, glutarates, isophthalates, phosphates, polyesters, sebacates, sulfonamides and terephthalates. The composition also may include a variety of optional ingredients and/or additives that are somewhat dependent on the particular application of the composition, such as dyes or pigments such as carbon black, graphite, red iron pigment, titanium dioxide, phthalocyanine blue, or combinations thereof, reinforcements, thixotropes, accelerators, surfactants, extenders, stabilizers, corrosion inhibitors, diluents, blowing agents and antioxidants. Suitable thixotropes include fumed silica, bentonite, stearic acid-coated calcium carbonate, fatty acid/oil derivatives and associative urethane thickeners such as RM-8 which is commercially available from Dow Chemical Company. Useful thixotropes that may be used include untreated fumed silica and treated fumed silica, Castor wax, clay, organo clay and combinations thereof. In addition, fibers such as synthetic fibers like Aramid® fiber and Kevlar® fiber, acrylic fibers, and/or engineered cellulose fiber may also be utilized. Thixotropes are generally present in an amount of up to about 20 weight percent. Optional additional ingredients such as carbon black or graphite, blowing agents, expandable polymeric microspheres or beads, such as polypropylene or polyethylene microspheres, surfactants and corrosion inhibitors like barium sulfonate are generally present in an amount of less than about 5 weight percent of the total weight of the composition.

According to the present invention, the composition may be a low-VOC adhesive composition and may have a VOC content of no more than 45.000 g/L calculated according to EPA Method 24, such as no more than 40.000 g/L, such as no more than 35.000 g/L, such as no more than 25.000 g/L. The composition may have a VOC content of 0.000 g/L calculated according to EPA Method 24 to 45.000 g/L calculated according to EPA Method 24, such as 25.000 g/L to 40.000 g/L.

According to the present invention, the composition may be a low-VOC adhesive composition and may have a VOC content of no more than 0.0011% by the CARB method, such as no more than 0.0005% by the CARB method.

The present invention also may be a method for preparing an adhesive composition comprising, or consisting essentially of, or consisting of, mixing a non-ionic platy filler, at least one second pigment material, and a binder. The non-ionic platy filler, at least one second pigment material, and binder may be any of those described above.

The composition may be at least partially dried at ambient temperature or cool or elevated temperatures and at a relative humidity of 10% to 90%, for any desired time period sufficient to at least partially dry the composition (e.g., from two hours to forty-eight hours) to form an adhesive, such as at a temperature of at least 4.4° C. to 35° C.

The present invention is directed to adhesive compositions that are used to bond together two substrate materials. The pieces may be aligned and pressure may be applied. The adhesive may be dried at greater than 4° C., such as ambient temperature, or higher than ambient temperature. Suitable substrate materials that may be bonded by the adhesive composition include, but are not limited to, materials such as natural materials such as wood, metals or metal alloys, polymeric materials such as hard plastics, or composite materials wherein each of the first and second substrate material may be independently selected from these materials. The adhesives of the present invention are particularly suitable for use in various construction applications in which substrate materials are bonded together with the adhesive and also are connected by fasteners such as screws, nails, or the like. Application of the adhesive composition to two substrates being bonded reduces the number of "fastener pops" that appear on one substrate surface as the adhesive dries compared to adhesive compositions known in the art, such as water-based or solvent-based compositions. As used herein, a "fastener pop" refers to a raised protrusion or bump in a substrate surface above where the fastener was inserted into the substrate and includes protrusion of a portion of the fastener, such as a fastener head, or protrusion of joint compound applied over a portion of the fastener, such as the fastener head. As used herein, a "fastener" includes a screw, a nail, a staple, or any other fastening device known in the industry.

The present invention also may be a method for forming a bonded substrate comprising, or consisting essentially of, or consisting of, applying the adhesive composition described above to a first substrate; contacting a second substrate to the adhesive composition such that the adhesive composition is located between the first and second substrate; and drying the adhesive composition. The adhesive composition can be applied to the surface of a substrate in any number of different ways, non-limiting examples of which include brushes, blades, rollers, films, pellets, spray guns and applicator guns.

The composition described above may be applied alone or as part of an adhesive system that can be deposited in a number of different ways onto a number of different substrates. The adhesive system may comprise a number of the same or different adhesive layers and may further comprise other coating compositions such as pretreatment compositions and the like. An adhesive layer is typically formed when an adhesive composition that is deposited onto the substrate is at least partially dried by methods known to those of ordinary skill in the art (e.g., by exposure to ambient conditions or heating).

After the adhesive composition is applied to a substrate and at least partially dried, the bonded substrate(s) may be evaluated visually for fastener pops, such as by counting the number of instances in which a protrusion caused by the fastener or the joint compound occurs when the adhesive composition is at least partially dried. It has been surprisingly found that the use of the adhesive composition of the present invention results in a reduced number of fastener pops compared to a conventional solvent-based adhesive composition. For example, the number of fastener pops may be reduced by at least 60% when the adhesive composition of the present invention is used to adhere sheetrock to a stud. For example, there may be 20% or fewer fastener pops at a temperature of 4° C. to 35° C. and a relative humidity of 10% to 90% counted at 7 days or less after application of the adhesive composition to a surface of at least one of the substrates; and/or 20% or fewer fastener pops at a temperature of 4° C. to 35° C. and a relative humidity of 10% to 90% counted at no more than 24 hours after application of the adhesive composition to a surface of at least one of the substrates.

It also has been surprisingly discovered that the low VOC water-based adhesive compositions of the present invention do not shrink to the same extent as other low VOC water-based adhesives. For example, 24 hours after application to a substrate surface, the adhesive has a shrinkage of less than 3.5 mm at a temperature of 4° C. to 35° C. and a relative humidity of 10% to 90%, such as less than 3.0 mm, such as less than 2.0 mm; 48 hours after application to a substrate surface, the adhesive has a shrinkage of less than 4.0 mm at a temperature of 4° C. to 35° C. and a relative humidity of 10% to 90%, such as less than 3.5 mm, such as less than 3.0 mm; (c) 72 hours after application to a substrate surface, the adhesive has a shrinkage of less than 4.5 mm at a temperature of 4° C. to 3° C. and a relative humidity of 10% to 90%, such as less than 4.0 mm, such as less than 3.7 mm; (d) 96 hours after application to a substrate surface, the adhesive has a shrinkage of less than 5.0 mm at a temperature of 4° C. to 35° C. and a relative humidity of 10% to 90%, such as less than 4.5 mm, such as less than 4.3 mm; and/or (e) 168 hours after application to a substrate surface, the adhesive has a shrinkage of less than 5.5 mm at a temperature of 4° C. to 35° C. and a relative humidity of 10% to 90%, such as less than 5.0 mm, such as less than 4.5 mm.

Aspects of the Invention

In the following, some non-limiting aspects of the present invention are summarized:

Aspect 1. A composition comprising:
a pigment mixture comprising a non-ionic platy filler present in the pigment mixture in an amount of 1% by weight to 9% by weight based on total weight of the pigment mixture and at least a second pigment material; and
a binder material.

Aspect 2. A composition comprising:
a pigment mixture comprising a non-ionic platy filler and at least one second pigment material present in the pigment mixture in an amount of at least 30% by weight based on total weight of the pigment mixture and having a weighted average oil absorption of 20 g linseed oil absorbed per 100 g at least one second pigment material based on total weight of the pigment mixture to 100 g linseed oil absorbed per 100 g at least one second pigment material based on total weight of the pigment mixture to; and
a binder material.

Aspect 3. The composition of Aspect 2, wherein the non-ionic platy filler is present in the pigment mixture in an amount of 1% by weight to 20% by weight based on total weight of the pigment mixture.

Aspect 4. The composition of any of the preceding Aspects, wherein the non-ionic platy filler has a particle size of 0.8 μm to 15 μm, according to manufacturer specifications.

Aspect 5. The composition of any of the preceding Aspects, wherein the non-ionic platy filler has an oil absorption of 20 g linseed oil absorbed per 100 g non-ionic platy filler to 100 g linseed oil absorbed per 100 g non-ionic platy filler.

Aspect 6. The composition of any of the preceding Aspects, wherein the second pigment material comprises a carbonate, an ionic platy filler, a silica, a fiber, a flake, a bead, or combinations thereof.

Aspect 7. The composition of any of the preceding Aspects, wherein the second pigment material has a particle size of 0.7 μm to 100 μm, according to manufacturer specifications.

Aspect 8. The composition of any of the preceding Aspects, wherein the binder comprises a film-forming polymer present in an amount of 20% by weight to 50% by weight based on total weight of the composition.

Aspect 9. The composition of any of the preceding Aspects, having a pigment to binder ratio of 4:1 to 1:1.

Aspect 10. The composition of any of the preceding Aspects, having a Brookfield viscosity of 300,000 cps to 3,000,000 cps measured at 5 rpm with a TD spindle at 25° C. measured at 30 days following mixing the binder and the pigment mixture.

Aspect 11. The composition of any of the preceding Aspects, having a total solids content of 64% by weight to 82% by weight based on total weight of the composition and/or a VOC content of no more than 45.000 g/L calculated according to the EPA Method 24 and/or a VOC content of no more than 0.0011% by the CARB Method.

Aspect 12. An adhesive comprising the composition of any of the preceding Aspects in an at least partially dried state.

Aspect 13. The adhesive of Aspect 12, wherein:
(a) 24 hours after application to a substrate surface, the adhesive has a shrinkage of less than 3.5 mm at a temperature of 4° C. to 35° C. and a relative humidity of 10% to 90%;
(b) 48 hours after application to a substrate surface, the adhesive has a shrinkage of less than 4.0 mm at a temperature of 4° C. to 35° C. and a relative humidity of 10% to 90%;
(c) 72 hours after application to a substrate surface, the adhesive has a shrinkage of less than 4.5 mm at a temperature of 4° C. to 35° C. and a relative humidity of 10% to 90%;
(d) 96 hours after application to a substrate surface, the adhesive has a shrinkage of less than 5.0 mm at a temperature of 4° C. to 35° C. and a relative humidity of 10% to 90%; and/or
(e) 168 hours after application to a substrate surface, the adhesive has a shrinkage of less than 5.5 mm at a temperature of 4° C. to 35° C. and a relative humidity of 10% to 90%.

Aspect 14. An article comprising:
a first substrate;
a second substrate; and
an adhesive composition comprising the adhesive of any of Aspects 1 to 11 positioned between the first and second substrates.

Aspect 15. The article of Aspect 14, further comprising a plurality of fasteners positioned through a depth of the first substrate and at least a portion of a depth of the second substrate.

Aspect 16. The article of Aspect 15, wherein the article has 20% or fewer fastener pops at a temperature of 4° C. to 35° C. and a relative humidity of 10% to 90% counted at 7 days or less after application of the adhesive composition to a surface of at least one of the substrates.

Aspect 17. The article of Aspect 15, wherein the article has 20% or fewer fastener pops at a temperature of 4° C. to 35° C. and a relative humidity of 10% to 90% counted at no more than 24 hours after application of the adhesive composition to a surface of at least one of the substrates.

Aspect 18. A method of forming a bond between two substrates comprising:
applying the composition of any of Aspects 1 to 11 to a first substrate; and
contacting a second substrate to the composition such that the composition is located between the first and second substrates.

Illustrating the invention are the following examples that are not to be considered as limiting the invention to their details. All parts and percentages in the examples, as well as throughout the specification, are by weight unless otherwise indicated.

EXAMPLES

Example 1

Formula A was compounded in the following manner: 31.16 g of tap water, 3.84 g of Triton X-405, 2.8 g of Propylene Glycol, and 2.80 g of Ethylene Glycol were charged to a 300 g Max Tall Speedmixer Cup. These components were then mixed for 30.0 s at 1000 rpm then 30.0 s at 1200 rpm in a Speedmixer DAC 600 Max mixer. Next, 0.80 g of Tamol 850/851 was added to the mixing cup and mixed for 30.0 s at 1000 rpm then 30.0 s at 1200 rpm. Next, 116.0 g of Encore 282 VAE latex was added to the mixing cup and mixed for 30.0 s at 1000 rpm then 30.0 s at 1200 rpm. Next, 0.60 g of Mergal 186 was added to the mixing cup and mixed for 30.0 s at 1000 rpm then 30.0 s at 1200 rpm. Then, 0.40 g of DrewPlus L-131 and 1.0 g of Rhodoline FT-100 was charged to the mixing cup and mixed for 30.0 s at 1000 rpm then 30.0 s at 1200 rpm. Next, 16.0 g of Snobrite and 122.0 g of Drikalite were charged to the mixing cup and mixed for 15.0 s at 1400 rpm, 25.0 s at 1800 rpm, and 30.0 s at 2000 rpm. Next, 40.0 g of Minex 4 was added to the mixing cup and mixed for 15.0 s at 1400 rpm, 25.0 s at 1800 rpm, and 30.0 s at 2000 rpm. Then, 14.0 g of Talcron MP-38 was weighed into the cup and mixed for 15.0 s at 1400 rpm, 25.0 s at 1800 rpm, and 30.0 s at 2000 rpm. Next, 8.0 g of Celetom MW-27 was charged to the cup and mixed for 15.0 s at 1400 rpm, 25.0 s at 1800 rpm, and 30.0 s at 2000 rpm. Then 20.0 g of tap water and 10.6 g of Benzoflex 9-88 were added to the cup and mixed for 30.0 s at 1000 rpm then 30.0 s at 1200 rpm. Next, 8.0 g of Acrysol TT-615 was charged to the cup and mixed for 30.0 s at 1000 rpm then 30.0 s at 1200 rpm. The sides of the cup were scraped down, and the cup and material were placed back into the mixer and blended for an additional 60.0 s at 1600 rpm. Finally, 2.0 g of 19% w/v Ammonium Hydroxide was added to the cup and mixed for 30.0 s at 1000 rpm then 30.0 s at 1200 rpm, the sides of the cup scraped down, them mixed for a final 60.0 s at 1600 rpm.

Comparative Adhesive Composition: Liquid Nails® brand DWP-30 drywall construction adhesive, commercially available from PPG Industries, Inc.

Test Assembly and Procedure

A test assembly was constructed for the purpose of determining the number of fastener pops that occur during given cure cycles. The assembly had overall dimensions of 23 inches in length, 15 inches in width and 1.5 inches in depth. The assembly was constructed from standard 2×4 framing studs which were 8 feet in length. One 2×4 stud was used per assembly and was cut down to two 15-inch long pieces and three 20-inch long pieces.

The frame was assembled as follows. The two 15-inch pieces were used as the top and bottom of the frame to represent the top and bottom plate of a framed wall. One 20-inch piece was placed between the 15-inch pieces on the left, and one 20-inch piece was placed between the 15-inch pieces on the right, forming a rectangular frame. The third 20-inch stud piece was placed in the center of this rectangle to represent a stud in the field of the frame, measured at 7.5 inches from the outside of both the top and bottom 15-inch pieces and positioned so that the 7.5-inch measurements ran through the centerline of the third 20-inch stud. This was modified from typical framing, which requires studs to be set 16 inches off center on a wall, for the purpose of this smaller testing assembly. Six 16d 3¼-inch vinyl-coated steel sinker nails were used to hold the frame together. One nail was hammered through the top and bottom plate each for each of the outer frame studs, 0.75 inch from the outside of the frame and 0.75 inch in from the top and bottom of the plate. The final two nails were hammered through the top and bottom plate set 7.5 inches from the outside frame and 0.75 inch from the top and bottom of each plate. A piece of ¼-inch drywall was cut to 23 inches in length and 15 inches in width to fit over the previously constructed simulated wall frame.

Each simulated wall frame and cut drywall to be used was conditioned for 24 hours at the specified temperature and humidity noted. A 10-ounce or 28-ounce tube of either Drywall Adhesive A or Comparative was also conditioned for 24 hours at the specified temperature before use.

Immediately prior to use, the nozzles of the adhesive tubes were cut to a ¼-inch bead size as indicated by the nozzle marking and placed into either a standard 10-ounce or 28-ounce caulking gun as required by the size of the adhesive tube. A ¼-inch bead of adhesive was extruded via the caulking gun in a continuous bead centered on the frame studs around the entire exterior of the simulated wall frame. A ¼-inch bead of adhesive was then extruded via the caulking gun down the center stud in the field of the frame, leaving a 2-inch gap located 10.5 inches in from both the top and bottom plate of the frame. The 23-inch by 15-inch by ¼-inch cut drywall was then laid on the frame assembly with the paper side down with no force other than the weight of the drywall being applied to the frame and bead of adhesive. Eleven #6 1⅝-inch drywall screws were then used to secure the drywall to the frame assembly, driving each screw to just below the paper surface. Three drywall screws were drilled into the top and bottom plate. Two were set 0.75 inch in from the outsides and 0.75 inch in from the top and bottom, with the third of each set 7.5 inches in from the sides and 0.75 inch in from the top and bottom. One screw was drilled into the center stud, located 11.5 inches from the top and bottom plates and 7.5 inches in from the sides of the frame assembly. Two drywall screws were drilled into the left outer frame stud, with one located 5.75 inches from the top plate and 0.75 inch in from the outside of the frame and the second located 5.75 inches from the bottom plate and 0.75 inch in from the outside of the frame. This was repeated on the right outer frame stud.

In the case of finishing the drywall on the same day of adhesive application, the following procedure was followed. Following the addition of adhesive to the frame and mounting the drywall to the frame as described above, premixed all-purpose joint compound (USG Sheetrock® Brand Pre-Mixed All-Purpose Joint Compound) was applied using a 2-inch joint knife to all of the countersunk screws. Enough joint compound was applied to each screw to fill the sunk screw hole and struck level with the drywall paper surface with the joint knife. The joint compound was left to dry per the manufacturer's instructions, and a second and/or third layer of joint compound was applied with drying between each subsequent layer added per manufacturer's instructions as needed to create a smooth level surface with the drywall paper surface. The final layer of joint compound was left to dry overnight, and screw protrusions were looked for and recorded 24 hours and 7 days after adhesive placement. For cases where the drywall was to be finished with joint compound 24 hours after adhesive was added to the frame, the same procedure was performed as above with the following differences. The frame assembly with adhesive bead added, drywall applied and screws drilled and countersunk in the drywall paper surface to secure the drywall to the frame was allowed to cure at the required temperature and humidity for 24 hours. At the end of the 24-hour timeframe, joint compound was applied over each screw in the manner described above utilizing 2-3 coats of compound as needed with the required drying period in between applications per manufacturer's instructions. At 48 hours and 7 days from adhesive application, the surface of the drywall and joint compound was inspected for screw protrusions and the results recorded.

Figure 1A:
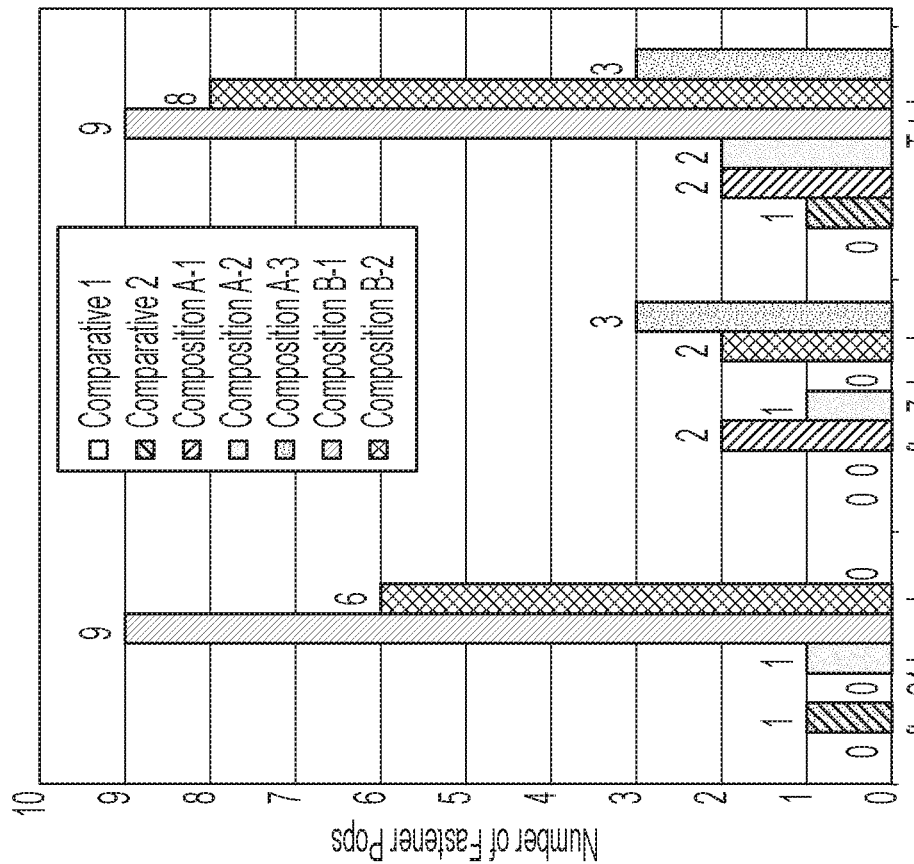
Figure 2B:
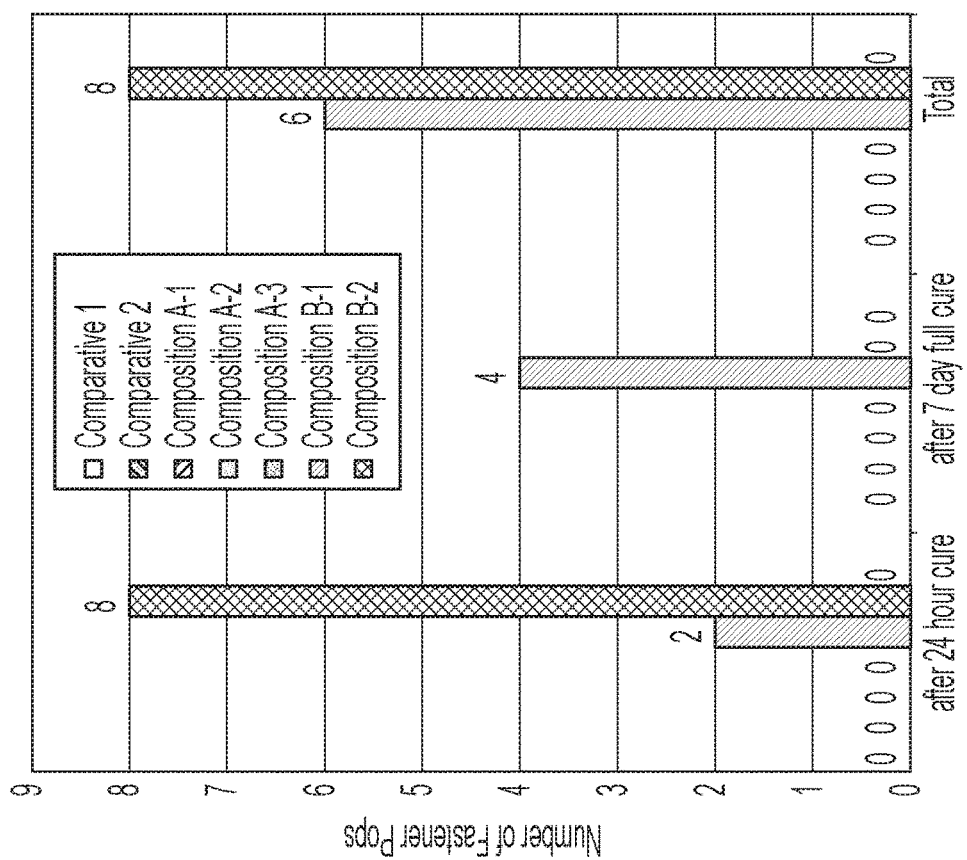
FIG. 2 shows the number of fastener pops per composition 24 hours and 7 days following attachment of the drywall to the stud at 4.4° C. and 15% relative humidity. In panel A, joint compound was applied to the fasteners on the same day as the adhesive was applied to the drywall and in panel B, joint compound was applied to the fasteners 18-24 hours after application of the adhesive composition to the drywall.
Figure 2A:
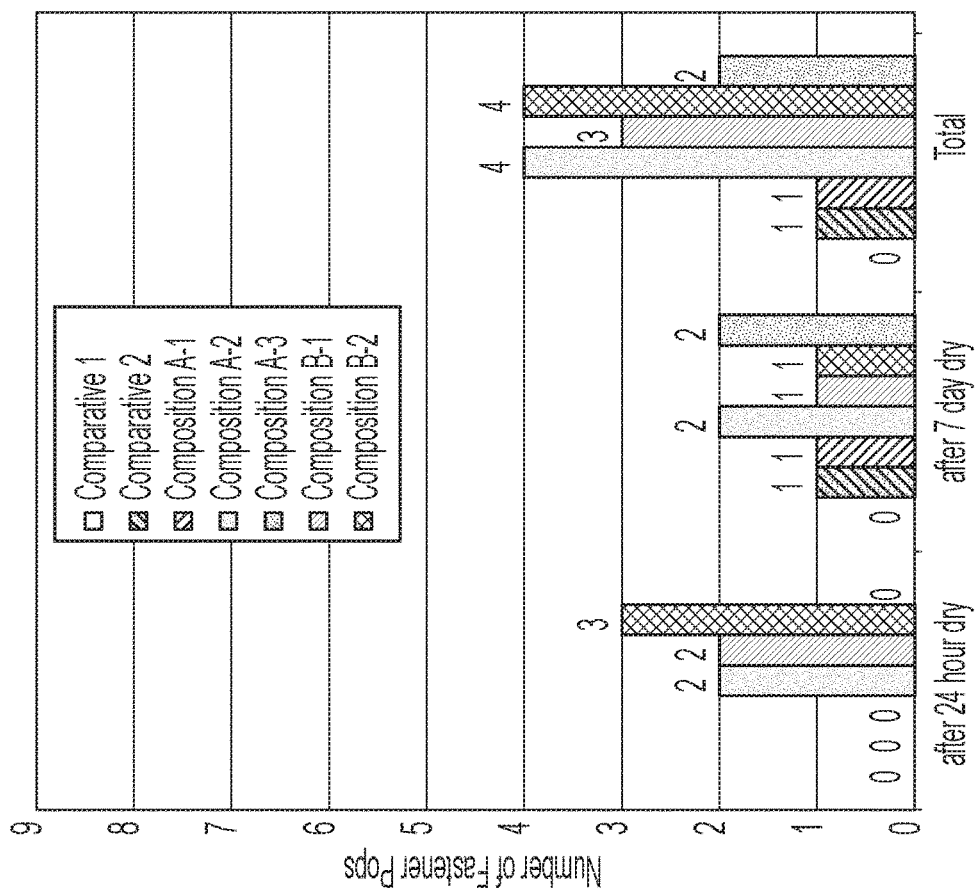
Figure 3:
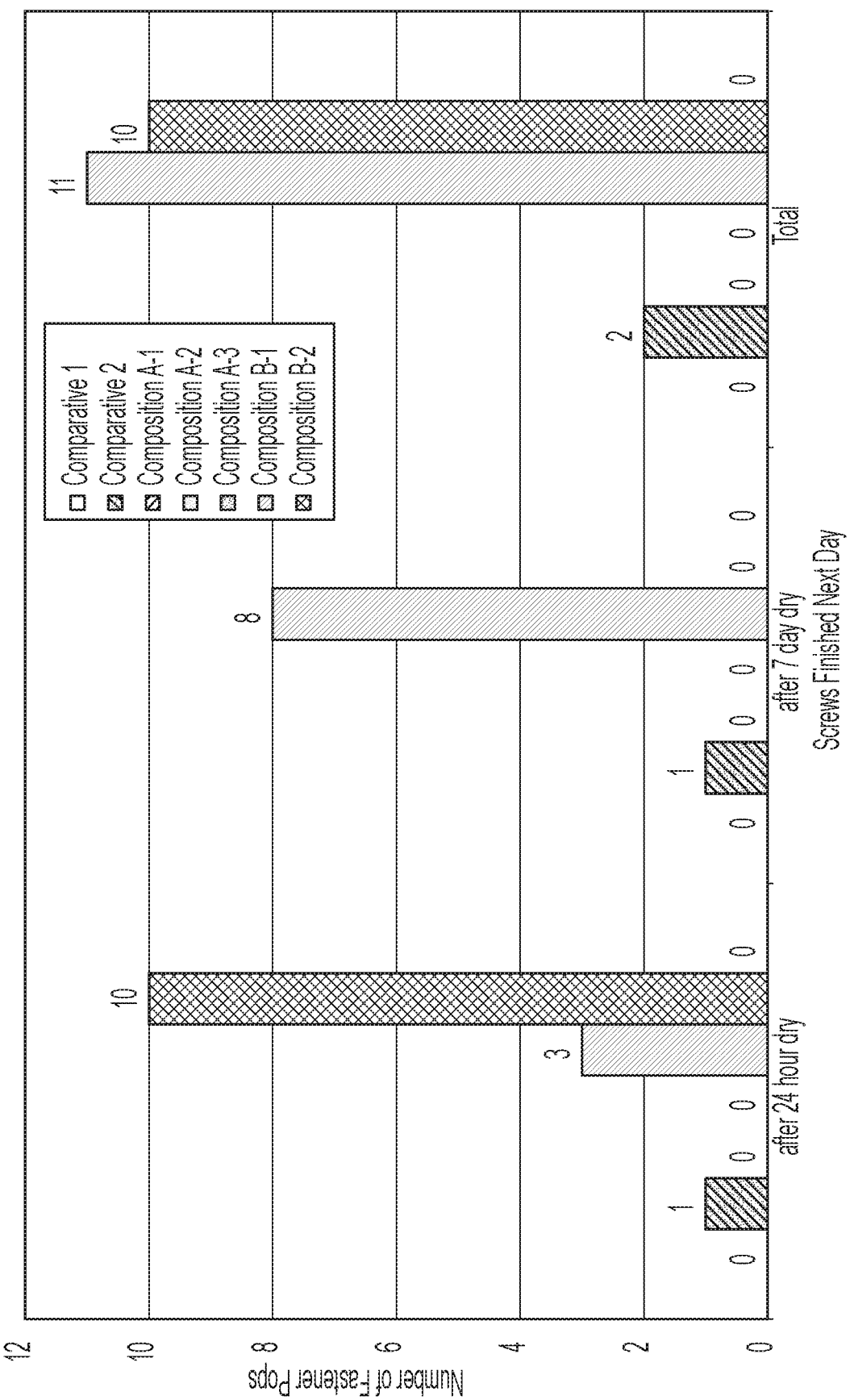
FIG. 3 shows the number of fastener pops per composition 24 hours and 7 days following attachment of the drywall to the stud at 32.2° C. and 50% relative humidity. In panel A, joint compound was applied to the fasteners on the same day as the adhesive was applied to the drywall and in panel B, joint compound was applied to the fasteners 18-24 hours after application of the adhesive composition to the drywall.

Results are shown in FIGS. 1 to 3. In each experiment, test assemblies including Comparative Composition 1 (adhesive composition without talc) were run in duplicate (Comparative Composition 1-1 and Comparative Composition 1-2), test assemblies including Composition A (adhesive composition with talc) were run in triplicate (Composition A-1, Composition A-2, and Composition A-3). A single test assembly was run for Comparative 2 (solvent-based adhesive) and Comparative 3 (no adhesive). In each Figure, panel A reports the number of fastener pops counted in test assemblies where the joint compound was applied over the fastener on the same day (within 8 hours) as adhesive composition was applied between the stud and the drywall, where fastener pops were counted 24-hour after application of the adhesive and 7 days after application of the adhesive. In each Figure, panel B reports the number of fastener pops counted in test assemblies where the joint compound was applied over the fastener on the next day (within 18-24 hours) after adhesive composition was applied between the stud and the drywall, where fastener pops were counted 24 hours after application of the adhesive and 7 days after application of the adhesive. Cumulative fastener pops (# fastener pops 24 hours after application of the adhesive plus # fastener pops 7 days after application of the adhesive) also are reported in each of panels A and B in each Figure.

FIGS. 1-3 show that both 24 hours after application of the adhesive and 7 days after application of the adhesive, test assemblies affixed with Composition A had fewer fastener pops than test assemblies affixed with Composition B and Composition A performed at least as well as Comparative 2 (solvent-based adhesive). These data demonstrate the importance of talc in the adhesive composition and demonstrate that the inventive Composition A, which is a low VOC composition, performs at least as well as Comparative 2.

Example 2

Test Assembly and Procedure

Test assemblies were constructed to compare shrinkage of adhesive compositions (described below). Each assembly had overall dimensions of 6 inches in length, 4.5 inches in width and 1.2 inches in depth. Two channels were created in each assembly centered 1.375 inches in from either side of the assembly with overall dimensions of the channels at 4 inches in length, 0.75 inches wide and 0.5 inches deep. The assembly was constructed from standard 0.7 inch thick and 0.5 inch thick plywood. The 0.7 inch thick plywood was cut from 8 foot by 4 foot sheets of plywood into 6 inch by 4.5 inch squares. The 0.5 inch plywood was cut from 8 foot by 4 foot sheets into 4 inch by 1 inch pieces and 4.5 inch by 1 inch pieces. Test assemblies were constructed as follows.

Figure 4:
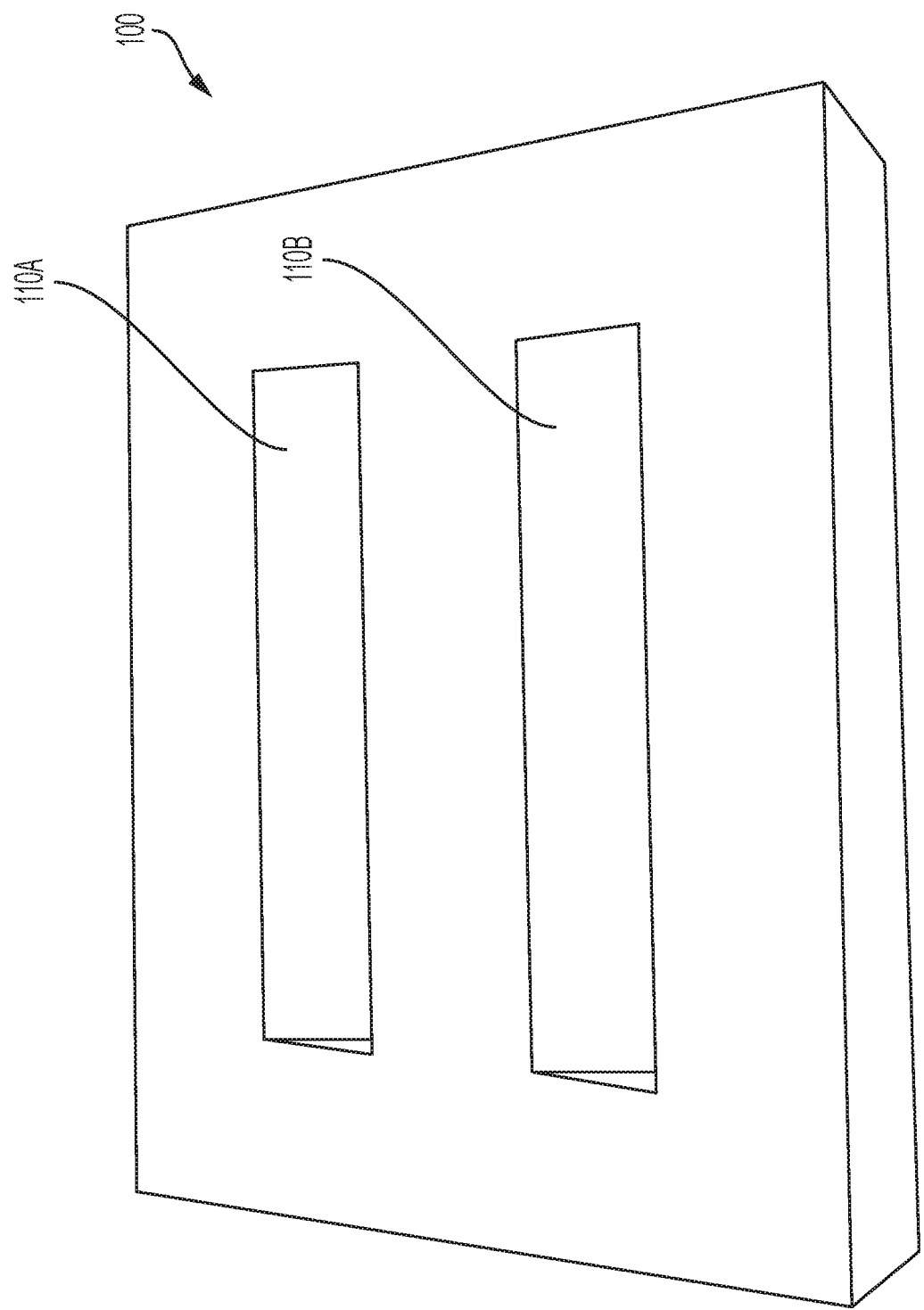
FIG. 4 shows a schematic of the test assembly utilized in Example 2.
Figure 5A:
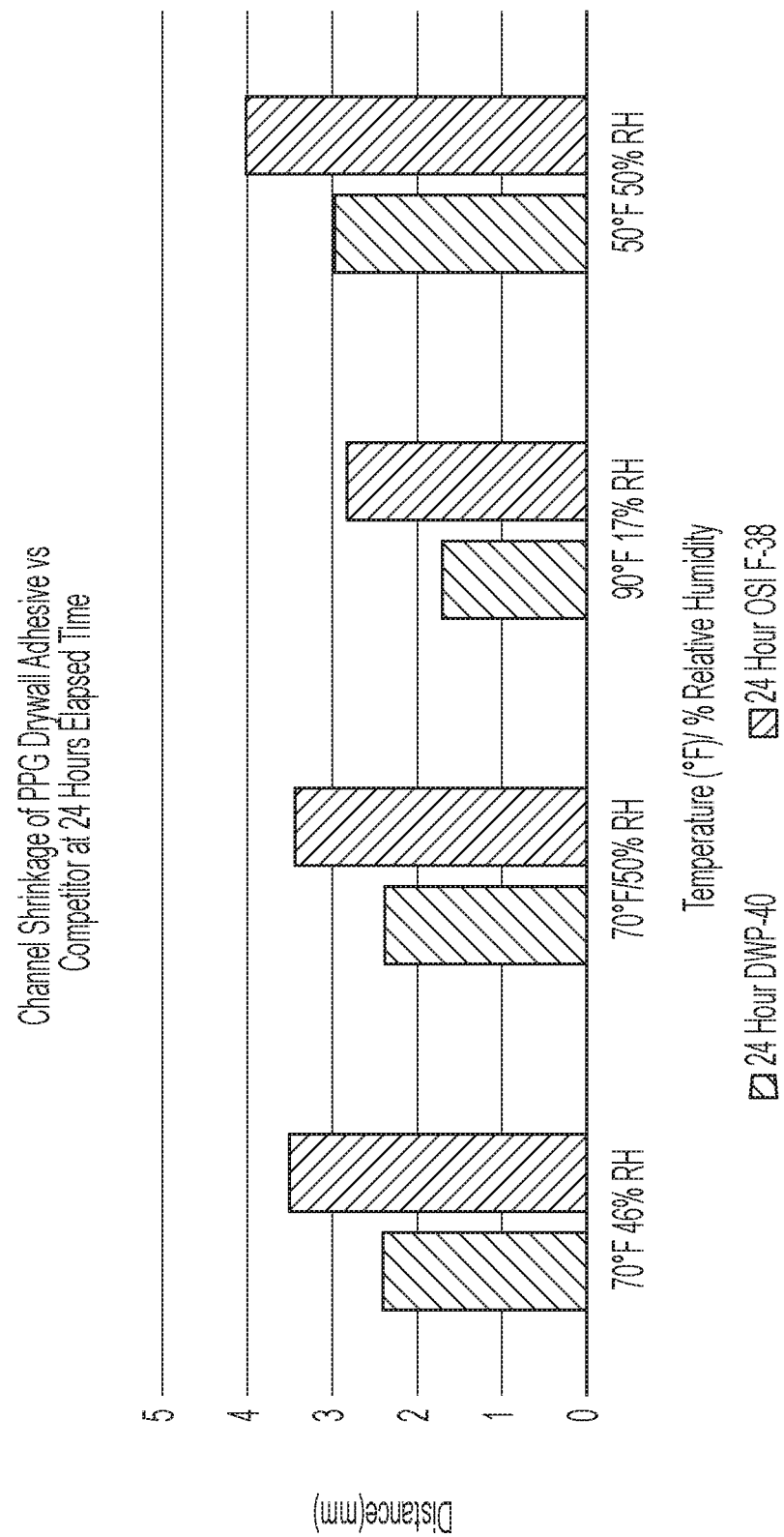
FIG. 5 shows the average shrinkage (mm) of the adhesive within the channels of the assemblies at varied temperatures and relative humidities at (A) 24 hours, (B) 48 hours, (C) 72 hours, (D) 96 hours, and (E) 168 hours after initial application of adhesive into the channels.
Figure 5B:
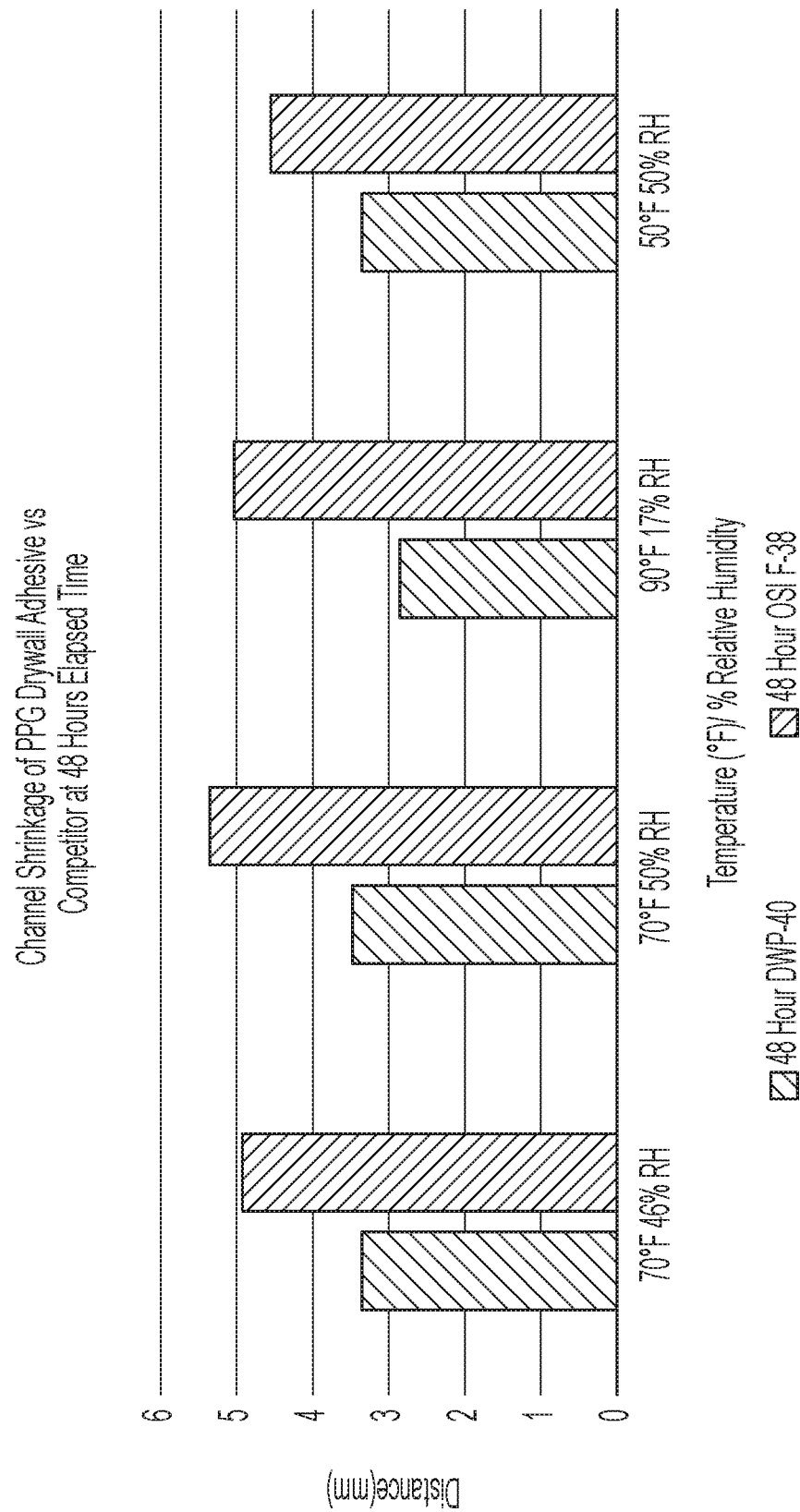
Figure 5C:
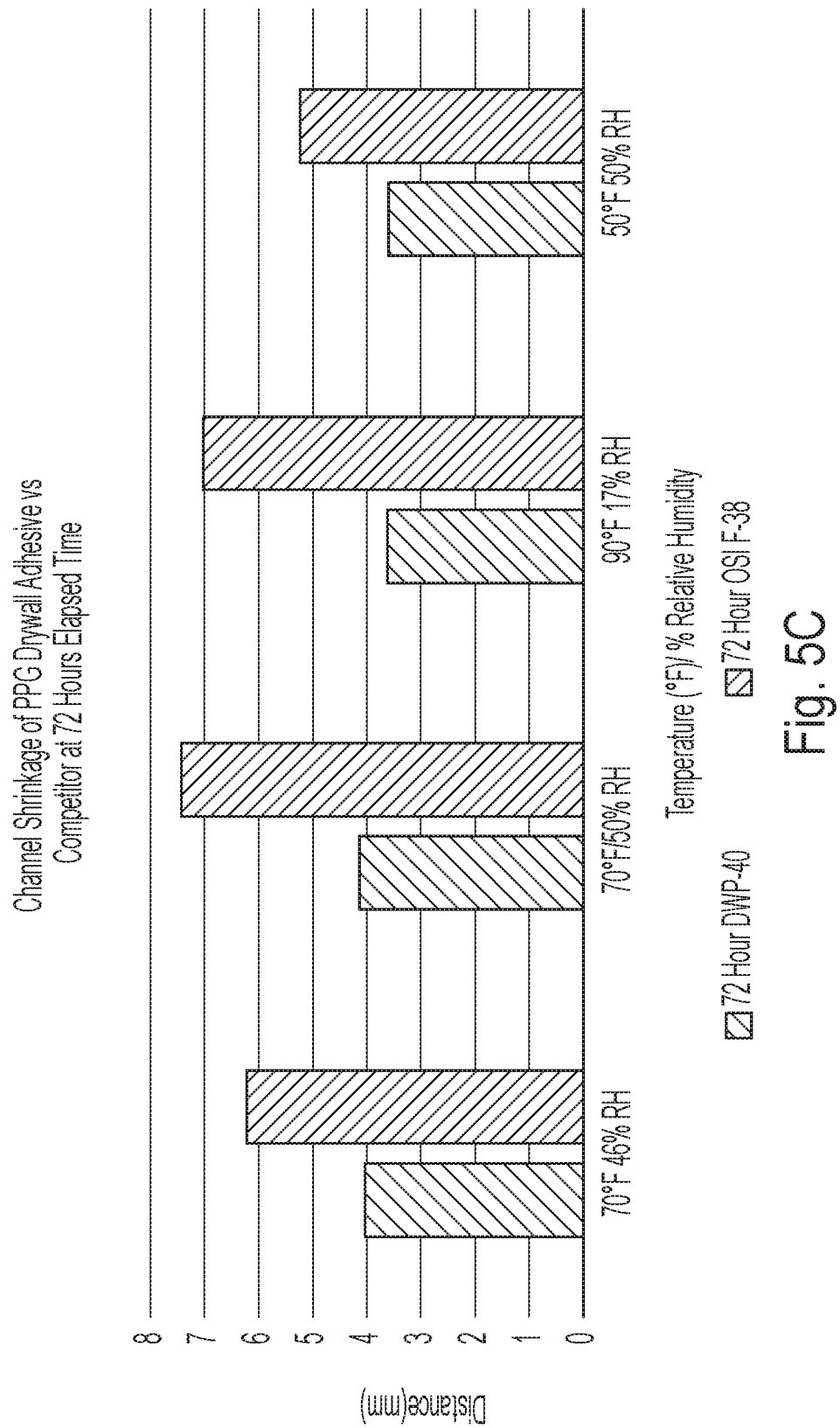

One 6 inch by 4.5 inch of 0.7 inch plywood formed the base of each assembly. One 4.5 inch by 1 inch piece of plywood was then nailed into the top (4.5 inch edge) of the 0.7 inch plywood base using an 18 gauge Brad nailer and three 1.0 inch brad nails. Three 4 inch by 1 inch pieces of 0.5 inch plywood were then spaced across the center of the 0.7 inch plywood base with the ends perpendicular to the 4.5 inch by 1.0 inch piece previously nailed into the 0.7 inch plywood and spaced such that two 0.75 inch wide channels were created. These were then nailed into the 0.7 inch plywood using 1.0 inch brad nails and the 18 gauge Brad nailer. Finally, a 4.5 inch by 1.0 inch piece of 0.5 inch plywood was placed perpendicular to the 3 previously nailed 4 inch by 1 inch strips of plywood and parallel to the bottom 4.5 inch wide edge of the 0.7 inch plywood, and nailed into the base using 1.0 inch brad nails using the 18 gauge Brad nailer. A schematic of one test assembly is shown in FIG. 4.

Tests were conducted at the following conditions: Condition A, 70° F. (21.1° C.)/46% relative humidity (RH) (i.e., "ambient"); Condition B, 70° F. (21.1° C.)/50% RH; Condition C, 90° F. (32.2° C.)/17% RH; and Condition D, 50° F. (10.0° C.)/50% RH. Each test assembly was conditioned for 24 hours at the specified temperature and humidity noted in the table. Conditions for Condition A were monitored using a Fischer Scientific Thermo Hygro Digital gauge (Thermo Fischer Scientific, Waltham, Mass.) set in the laboratory near the samples. An Environmental Growth Chamber (Environmental Growth Chambers—Chagrin Falls, Ohio) walk-in temperature and humidity controlled room was used for testing at Condition B. A VWR Scientific Model 9000 Humidity Cabinet (VWR International LLC, Radnor, Pa.) was used for testing at Condition C. An Eviro "A" ESL-3CA Exposure Chamber (ESPEC North America Inc., Hudsonville, Mich.) was utilized for testing at Condition D.

A 10 ounce or 28 ounce tube of Liquid Nails® Drywall Advanced Construction Adhesive (DWP-40) (commercially available from PPG Industries, Inc.) ("Experimental Adhesive," a water-based adhesive containing a non-ionic platy filler present in the pigment mixture in an amount of no more than 9% by weight based on total weight of the pigment mixture, a second pigment material in an amount of at least 30% by weight based on total weight of the pigment mixture and having a weighted average oil absorption of 20 g linseed oil absorbed per 100 g at least one second pigment material based on total weight of the pigment mixture to 100 g linseed oil absorbed per 100 g at least one second pigment material based on total weight of the pigment mixture to, and a binder material and having a VOC of 38.003 g/L calculated according to EPA Method 24 and a VOC of 0.0011% according to the CARB Method) or a comparative sample (OSI F38 VOC Drywall and Panel Adhesive (a water-based polyvinyl acetate latex adhesive commercially available from Henkel Corporation, Rocky Hill, Conn.) having a VOC 0.1% by the CARB Method) were conditioned for 24 hours at the specified temperature before use. The nozzles of the adhesive tubes were cut on an angle to a ¼ inch bead size as indicated by the nozzle marking and placed into either a standard 10 ounce or 28 ounce caulking gun, (both guns used were Heavy Duty Caulking Guns from LG Sourcing Inc., North Wilkesboro, N.C.), as required by the size of the adhesive tube. A ¼ inch bead of adhesive was extruded via the caulking gun to fill both channels in the test assembly being sure to prevent any air bubble entrapment or leaving air voids in the corners of the channels. The adhesive was then struck level with sides of the channel using the flat portion of a 5 in 1 tool, discarding any adhesive taken off by the 5 in 1 tool. Five assemblies (each having two channels as described above) per test Condition then were placed in their respective condition. Readings were taken at 24 hours, 48 hours, 72 hours, 96 hours, and 168 hours after initial application of adhesive into the channels. For Conditions B, readings were made inside the chamber. For Conditions C and D, assemblies were removed to ambient conditions only for the purpose of reading depths, and immediately were placed back into the appropriate chamber. Shrinkage was measured by measuring the depth of adhesive in each channel of the assembly using a 4 decimal place digital caliper, (Pittsburgh 6 inch Digital Caliper, Harbor Freight Tools, Calabasas, Calif.). Depth was measured at five different points in each channel. The average of the measurements made (i.e., two channels, and five points per channel) for each condition at each time point is reported in FIGS. 5A to 5E.

As shown in FIGS. 5A-5E, shrinkage (depth in mm) was significantly less in channels containing the Experimental Adhesive compared to the Comparative Adhesive. Specifically, at all time points measured (24 hours, 48 hours, 72 hours, 96 hours, and 168 hours after initial application of adhesive into the channels) and regardless of temperature and relative humidity conditions, shrinkage was significantly less in channels containing the Experimental Adhesive compared to the Comparative Adhesive. These data indicate that the low VOC water-based Experimental Composition does not shrink to the same extent as other low VOC water-based adhesives such as the Comparative Adhesive.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying Claims.

We claim:

1. A composition comprising:
a pigment mixture comprising a first pigment material comprising a non-ionic platy filler present in the pigment mixture in an amount of 1% by weight to 9% by weight based on total weight of the pigment mixture and at least a second pigment material; and
a binder material comprising a film-forming polymer present in an amount of 20% by weight to 50% by weight based on total weight of the composition;
wherein the composition comprises a total solids content of at least 67% by weight and no more than 82% by weight based on total weight of the composition; and
wherein the composition is formulated as an adhesive composition.

2. The composition of claim 1, wherein the composition has a volatile organic content of no more than 45.000 g/L calculated according to EPA Method 24.

3. The composition of claim 1, wherein the non-ionic platy filler has an oil absorption of 20 g linseed oil absorbed per 100 g non-ionic platy filler to 100 g linseed oil absorbed per 100 g non-ionic platy filler.

4. The composition of claim 1, having a pigment to binder weight ratio of 4:1 to 1:1.

5. The composition of claim 1, having a Brookfield viscosity of 300,000 cps to 3,000,000 cps measured at 5 rpm with a TD spindle at 25° C. measured at 30 days following mixing the binder and the pigment mixture.

6. The composition of claim 1, wherein:
(a) 24 hours after application to a substrate surface, the adhesive has a shrinkage of less than 3.5 mm at a temperature of 4° C. to 35° C. and a relative humidity of 10% to 90%;
(b) 48 hours after application to a substrate surface, the adhesive has a shrinkage of less than 4.0 mm at a temperature of 4° C. to 35° C. and a relative humidity of 10% to 90%;
(c) 72 hours after application to a substrate surface, the adhesive has a shrinkage of less than 4.5 mm at a temperature of 4° C. to 35° C. and a relative humidity of 10% to 90%;
(d) 96 hours after application to a substrate surface, the adhesive has a shrinkage of less than 5.0 mm at a temperature of 4° C. to 35° C. and a relative humidity of 10% to 90%; and/or
(e) 168 hours after application to a substrate surface, the adhesive has a shrinkage of less than 5.5 mm at a temperature of 4° C. to 35° C. and a relative humidity of 10% to 90%.

7. An adhesive comprising the composition of claim 1 in an at least partially dried state.

8. An article comprising:
a first substrate;
a second substrate; and
an adhesive comprising the composition of claim 1 in an at least partially dried state positioned between the first and second substrates.

9. The article of claim 8, further comprising a plurality of fasteners positioned through a depth of the first substrate and at least a portion of a depth of the second substrate, wherein the article has at least one of the following:
(a) 20% or fewer fastener pops at a temperature of 4° C. to 35° C. and a relative humidity of 10% to 90% counted at 7 days or less after application of the adhesive composition to a surface of at least one of the substrates; and/or
(b) 20% or fewer fastener pops at a temperature of 4° C. to 35° C. and a relative humidity of 10% to 90% counted at no more than 24 hours after application of the adhesive composition to a surface of at least one of the substrates.

10. A method of forming a bond between two substrates comprising:
applying the composition of claim 1 to a first substrate; and
contacting a second substrate to the composition such that the composition is located between the first and second substrates.

11. A composition comprising:
a pigment mixture comprising a first pigment material comprising a non-ionic platy filler present in the pigment mixture in an amount of 1% by weight to 9% by weight based on total weight of the pigment mixture and at least one second pigment material present in the pigment mixture in an amount of at least 30% by weight based on total weight of the pigment mixture and having a weighted average oil absorption of 20 g linseed oil absorbed per 100 g at least one second pigment material based on total weight of the pigment mixture to 100 g linseed oil absorbed per 100 g at least one second pigment material based on total weight of the pigment mixture; and
a binder material comprising a film-forming polymer present in an amount of 20% by weight to 50% by weight based on total weight of the composition; and
wherein the composition comprises a total solids content of at least 67% by weight and no more than 82% by weight based on total weight of the composition; and
wherein the composition is formulated as an adhesive composition.

12. The composition of claim 11, wherein the composition has a volatile organic content of no more than 45.000 g/L calculated according to EPA Method 24.

13. The composition of claim 11, wherein the non-ionic platy filler has an oil absorption of 20 g linseed oil absorbed per 100 g non-ionic platy filler to 100 g linseed oil absorbed per 100 g non-ionic platy filler.

14. The composition of claim 11, having a pigment to binder weight ratio of 4:1 to 1:1.

15. The composition of claim 11, having a Brookfield viscosity of 300,000 cps to 3,000,000 cps measured at 5 rpm with a TD spindle at 25° C. measured at 30 days following mixing the binder and the pigment mixture.

16. The composition of claim 11, wherein:
(a) 24 hours after application to a substrate surface, the adhesive has a shrinkage of less than 3.5 mm at a temperature of 4° C. to 35° C. and a relative humidity of 10% to 90%;
(b) 48 hours after application to a substrate surface, the adhesive has a shrinkage of less than 4.0 mm at a temperature of 4° C. to 35° C. and a relative humidity of 10% to 90%;
(c) 72 hours after application to a substrate surface, the adhesive has a shrinkage of less than 4.5 mm at a temperature of 4° C. to 35° C. and a relative humidity of 10% to 90%;
(d) 96 hours after application to a substrate surface, the adhesive has a shrinkage of less than 5.0 mm at a temperature of 4° C. to 35° C. and a relative humidity of 10% to 90%; and/or
(e) 168 hours after application to a substrate surface, the adhesive has a shrinkage of less than 5.5 mm at a temperature of 4° C. to 35° C. and a relative humidity of 10% to 90%.

17. An adhesive comprising the composition of claim 11 in an at least partially dried state.

18. An article comprising:
a first substrate;
a second substrate; and
an adhesive comprising the composition of claim 11 in an at least partially dried state positioned between the first and second substrates.

19. The article of claim 18, further comprising a plurality of fasteners positioned through a depth of the first substrate and at least a portion of a depth of the second substrate, wherein the article has at least one of the following:
(a) 20% or fewer fastener pops at a temperature of 4° C. to 35° C. and a relative humidity of 10% to 90% counted at 7 days or less after application of the adhesive composition to a surface of at least one of the substrates; and/or
(b) 20% or fewer fastener pops at a temperature of 4° C. to 35° C. and a relative humidity of 10% to 90% counted at no more than 24 hours after application of the adhesive composition to a surface of at least one of the substrates.

20. A method of forming a bond between two substrates comprising:
applying the composition of claim 12 to a first substrate; and
contacting a second substrate to the composition such that the composition is located between the first and second substrates.

\* \* \* \* \*